US008116557B2

(12) United States Patent
Ha et al.

(10) Patent No.: US 8,116,557 B2
(45) Date of Patent: Feb. 14, 2012

(54) 3D IMAGE PROCESSING APPARATUS AND METHOD

(75) Inventors: Tao-hyeun Ha, Suwon-si (KR); Jae-phil Koo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 982 days.

(21) Appl. No.: 11/546,337

(22) Filed: Oct. 12, 2006

(65) Prior Publication Data

US 2007/0081716 A1 Apr. 12, 2007

(30) Foreign Application Priority Data

Oct. 12, 2005 (KR) .................. 10-2005-0096196

(51) Int. Cl.
*G06K 9/00* (2006.01)

(52) U.S. Cl. .................. 382/154; 345/419; 345/427

(58) Field of Classification Search .................. 382/154, 382/168, 254, 275, 276; 345/419–427
See application file for complete search history.

(56) References Cited

U.S. PATENT DOCUMENTS

| 5,020,878 A * | 6/1991 | Brokenshire et al. ......... 359/466 |
| 5,867,591 A | 2/1999 | Onda |
| 2004/0208357 A1* | 10/2004 | Tokuhashi et al. ............ 382/154 |

FOREIGN PATENT DOCUMENTS

| CN | 1643939 A | 7/2005 |
| EP | 1489857 A1 * | 12/2004 |
| JP | 7-336669 A | 12/1995 |
| JP | 2003-158751 A | 5/2003 |
| KR | 10-2002-0037097 A | 5/2002 |
| WO | 2005/020591 A1 | 3/2005 |

OTHER PUBLICATIONS

McVeigh, J.S., et al., "Algorithm for automated eye strain reduction in real stereoscopic images and sequences", Human Vision and Electronic Imaging, 1996, pp. 307-316, XP002609907.
Search Report issued Nov. 17, 2010 in counterpart Dutch Application No. 1032656.

* cited by examiner

*Primary Examiner* — Wesley Tucker
(74) *Attorney, Agent, or Firm* — Sughrue Mion, PLLC

(57) ABSTRACT

Provided are an image processing apparatus and method which can adjust the disparity of an input three-dimensional (3D) image and stably display the 3D image. The image processing apparatus includes: an image dividing unit receiving a 3D image and dividing the 3D image into a left-eye image and a right-eye image; a histogram generation unit estimating disparities between the left-eye image and the right-eye image, measuring a frequency with which the estimated disparities occur, and generating a histogram of the disparities and the frequency; a horizontal movement value determination unit determining a horizontal movement value for the left-eye image and the right-eye image using the generated histogram; and a horizontal movement unit moving the left-eye image and the right-eye image horizontally based on the determined horizontal movement value. The image processing apparatus can control convergence of an image to enhance 3D effects and reduce eye fatigue.

17 Claims, 7 Drawing Sheets

FIG. 1A    FIG. 1B    FIG. 1C
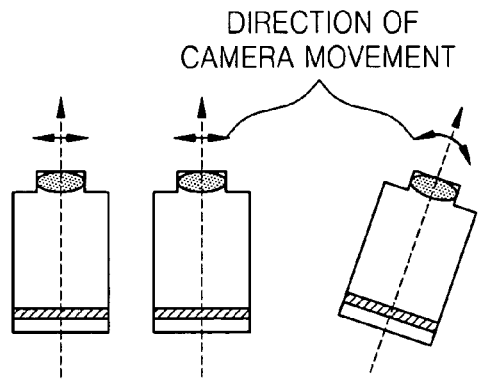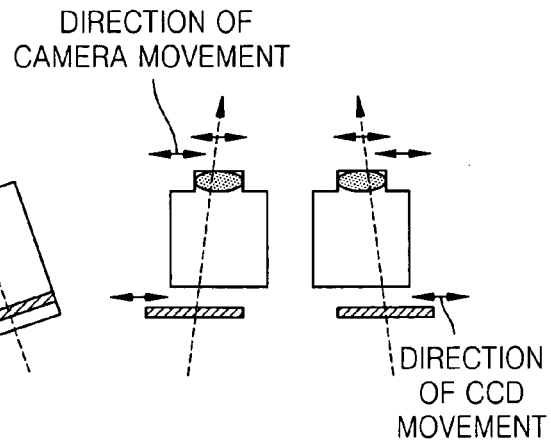
FIG. 2
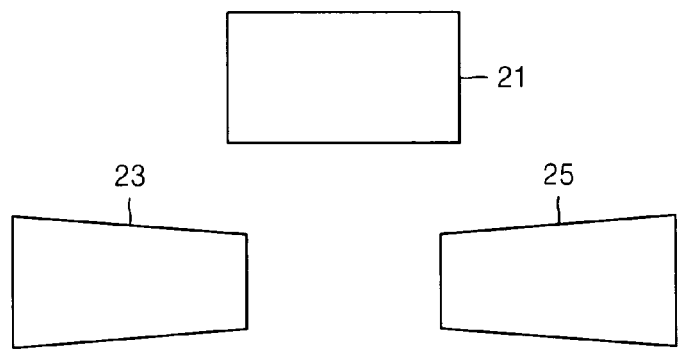
FIG. 3
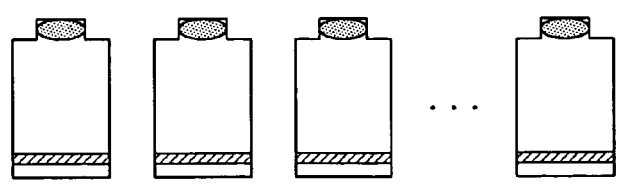

FIG. 4
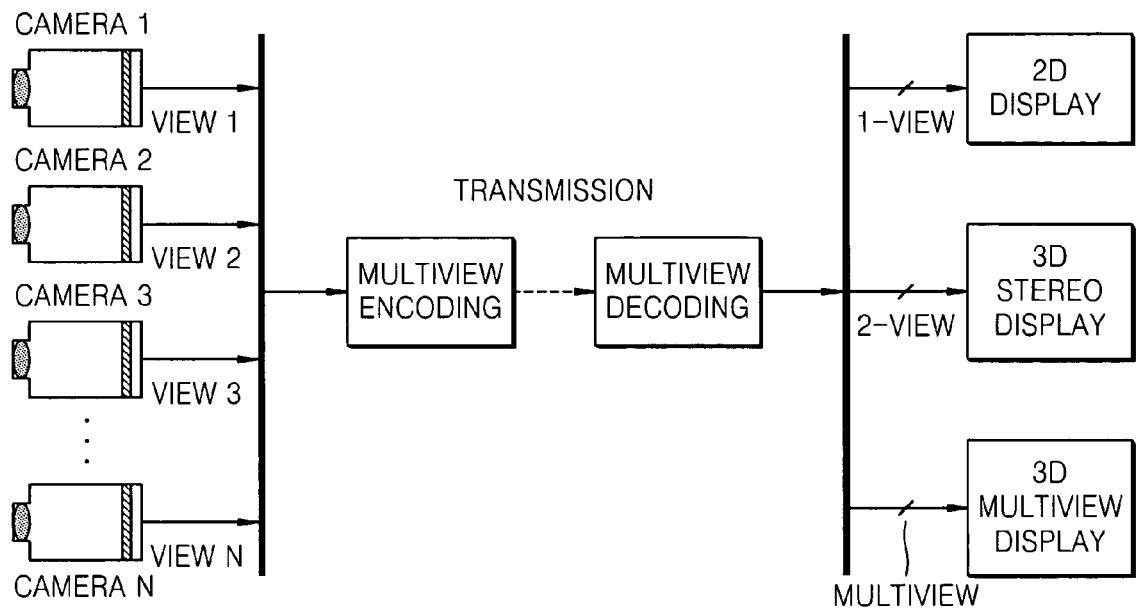
FIG. 5A     FIG. 5B
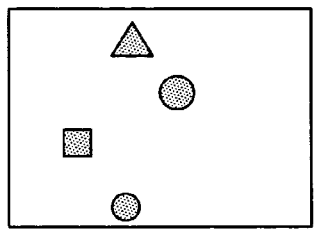 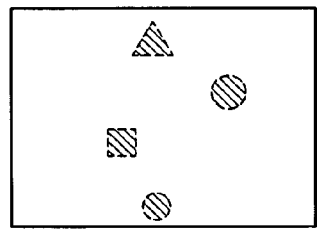
FIG. 5C
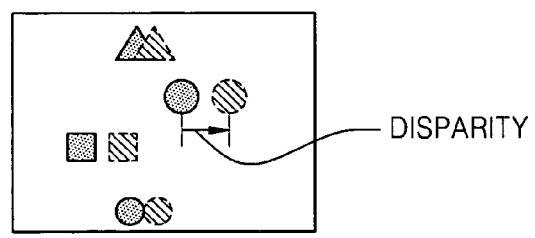

3D IMAGE PROCESSING APPARATUS AND METHOD

BACKGROUND OF THE INVENTION

This application claims the priority of Korean Patent Application No. 10-2005-0096196, filed on Oct. 12, 2005, in the Korean Intellectual Property Office, the disclosure of which is incorporated herein in its entirety by reference.

1. Field of the Invention

The present invention relates to an apparatus and method for processing a three-dimensional (3D) image, and more particularly, to an image processing apparatus and method for adjusting the disparity of an input 3D image and stably displaying the 3D image.

2. Description of the Related Art

Conventional three-dimensional (3D) displays display a 3D image by projecting images having different disparities to the left and right eyes of a user using a 2D flat display and tools such as a film-type micro-polarizer, a parallax barrier, and a lenticular lens. Such 3D displays may be classified into stereoscopic 3D displays and multiview 3D displays according to the number of views displayed thereon. Stereoscopic 3D displays display an image having two different views, and multiview 3D displays display an image having more than two views.

To produce a 3D image, a real image is filmed by a stereoscopic camera including two incident lenses or a multiview camera including a plurality of incident lenses. Alternatively, stereo or multiview image contents may be produced using computer graphics.

When a 3D image is produced using a 3D camera or when producing image contents using computer graphics, characteristics of human vision are taken into consideration. However, when a display environment is different from a production environment, for example, when a 3D image produced using a multiview camera is displayed on a stereoscopic 3D display or when displays of different sizes are used for producing and displaying a 3D image, conventional 3D displays cannot display a 3D image as intended.

SUMMARY OF THE INVENTION

An aspect of the present invention provides an image processing apparatus and method which can be used to enhance three-dimensional (3D) effects and reduce eye fatigue to use an image acquired by a multiview camera for a 3D stereo display.

An aspect of the present invention provides an image processing apparatus and method which can be used to control convergence of an image by adjusting the disparity of the image at a receiving end which receives and displays a 3D image.

According to an aspect of the present invention, there is provided an image processing apparatus including: an image dividing unit receiving a three-dimensional (3D) image and dividing the 3D image into a left-eye image and a right-eye image; a histogram generation unit estimating disparities between the left-eye image and the right-eye image, measuring a frequency with which the estimated disparities occur, and generating a histogram of the disparities and the frequency; a horizontal movement value determination unit determining a horizontal movement value for the left-eye image and the right-eye image using the generated histogram; and a horizontal movement unit horizontally moving the left-eye image and the right-eye image based on the determined horizontal movement value.

The horizontal movement value determination unit may calculate a threshold value which renders a predetermined ratio of the disparities in the histogram to be positive and determine the horizontal movement value using the calculated threshold value. The horizontal movement value determination unit may determine a value corresponding to half the threshold value to be the horizontal movement value.

The horizontal movement unit may move the left-eye image and the right-eye image horizontally based on the threshold value and thus adjust the disparity.

The apparatus may further include a user interface unit receiving the predetermined ratio or the threshold value from a user through a user input signal and transmitting the predetermined ratio or the threshold value to the horizontal movement value determination unit, wherein the horizontal movement value determination unit determines the horizontal movement value using the received predetermined ratio or threshold value. The apparatus may further include a 3D stereo display unit displaying the disparity-adjusted left-eye image and right-eye image output from the horizontal movement unit.

According to another aspect of the present invention, there is provided an image processing method including: receiving a three-dimensional (3D) image and dividing the 3D image into a left-eye image and a right-eye image; estimating disparities between the left-eye image and the right-eye image, measuring a frequency with which the estimated disparities occur, and generating a histogram of the disparities and the frequency; determining a horizontal movement value for the left-eye image and the right-eye image using the generated histogram; and moving the left-eye image and the right-eye image horizontally based on the determined horizontal movement value to adjust disparities.

According to another aspect of the present invention, there is provided a computer-readable recording medium on which a program for executing the image processing method is recorded.

BRIEF DESCRIPTION OF THE DRAWINGS

The above and other features and advantages of the present invention will become more apparent by describing in detail exemplary embodiments thereof with reference to the attached drawings in which:

FIGS. 1A-1C illustrate types of stereoscopic cameras;

FIG. 2 illustrates problems created when a filming operation is performed using a toed-in stereoscopic camera;

FIG. 3 illustrates the structure of a multiview camera;

FIG. 4 illustrates an application of multiview video coding;

FIGS. 5A-5C illustrate a left-eye image and a right-eye image filmed by a parallel multiview camera according to an embodiment of the present invention;

DETAILED DESCRIPTION OF THE INVENTION

Figure 6A:
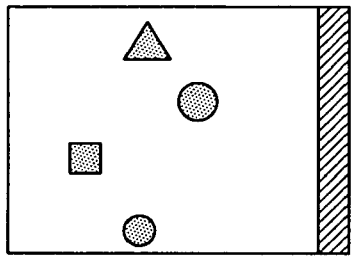
FIGS. 6A-6C illustrate a process of generating a stable stereo image by moving a left-eye image and a right-eye image of FIG. 5 to the right and left, respectively, according to an exemplary embodiment of the present invention.

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

The structure of a camera which produces a real image will now be described with reference to FIGS. 1 and 3.

FIGS. 1A-1C illustrate types of stereoscopic cameras. FIG. 1A illustrates a parallel stereoscopic camera. The alignment of the parallel stereoscopic camera is simple. However, since the parallel stereoscopic camera does not have a convergence function, it cannot take a photograph of an image in consideration of characteristics of human vision. Thus, the filmed image cannot be used as a three-dimensional (3D) image. FIG. 1B illustrates a toed-in stereoscopic camera. The toed-in stereoscopic camera has a convergence function, and closely reflects characteristics of human vision. However, the toed-in stereoscopic camera has problems illustrated in FIG. 2.

FIG. 2 illustrates problems created when a filming operation is performed using the toed-in stereoscopic camera illustrated in FIG. 1B.

When a square subject 21 is positioned between camera axes of left and right cameras as illustrated in FIG. 2, images 23 and 25 respectively filmed by the left and right cameras are distorted as illustrated in FIG. 2. Such distortions of the images 23 and 25 cause eye fatigue when the images 23 and 25 are used for a 3D image.

FIG. 1C illustrates a hybrid stereoscopic camera aligned in such a way to prevent the drawbacks of the parallel stereoscopic camera and the toed-in stereoscopic camera respectively illustrated in FIGS. 1A and 1B. In the hybrid stereoscopic camera, lens units and charge-coupled device (CCD) units can be moved separately. Therefore, convergence can be controlled by adjusting positions of the CCD units and lenses.

FIG. 3 illustrates the structure of a multiview camera.

A conventional method of filming a multiview image uses the multiview camera structured as illustrated in FIG. 3. In an ongoing standardization process of motion picture experts group (MPEG) 3D audio video (3DAV), an image filmed by the multiview camera of FIG. 3 is used as a standard image. A stereoscopic camera can have the structure illustrated in FIG. 1C. However, in the case of multi-view video filming, it is realistically infeasible to control convergence for each image.

FIG. 4 illustrates an application of multiview video coding.

Referring to FIG. 4, an image output from a multi-view camera composed of N cameras is compressed and stored or transmitted in a multiview encoding process and then reconstructed in a multiview decoding process. The reconstructed image may be displayed according to application of a display device. That is, an image sequence of a view is displayed on a 2D display. For a 3D stereo display, two views are selected and used to display a 3D image on the 3D stereo display. For a 3D multiview display, at least two views are selected and used to display a 3D multiview image on the 3D multiview display. When two image sequences are used to display a 3D image on the 3D stereo display, the 3D stereo display has the same problems as the parallel stereoscopic camera illustrated in FIG. 1A. Therefore, an image acquired by a muliview camera must be properly processed to be displayed on the 3D stereo display.

FIGS. 5A-5C illustrate a left-eye image and a right-eye image filmed by a parallel multiview camera according to an embodiment of the present invention. When it is assumed that two views are selected from image sequences output from a parallel multiview camera and are used for a 3D stereo display, a phenomenon illustrated in FIGS. 5A-5C occurs.

FIG. 5A illustrates the left-eye image, and FIG. 5B illustrates the right-eye image. FIG. 5C illustrates the left-eye image of FIG. 5A superimposed on the right-eye image of FIG. 5B in one plane to present a disparity between them. It is assumed that positive disparity exists when objects of the right-eye image exist on the right side of identical objects of the left-eye image. In this case, images of all objects within the superimposed image illustrated in FIG. 5C have positive disparities. In other words, it can be said that no converged point exists due to characteristics of the parallel camera or that converged points exist outside the screen.

When the superimposed image illustrated in FIG. 5C is displayed on a 3D stereo display, the images of all objects within the superimposed image appear to protrude from the screen. This kind of disparity, i.e., depth, causes eye fatigue and reduces 3D effects.

Figure 6B:
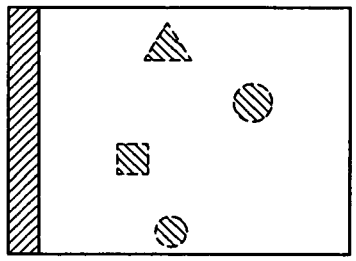
Figure 6C:
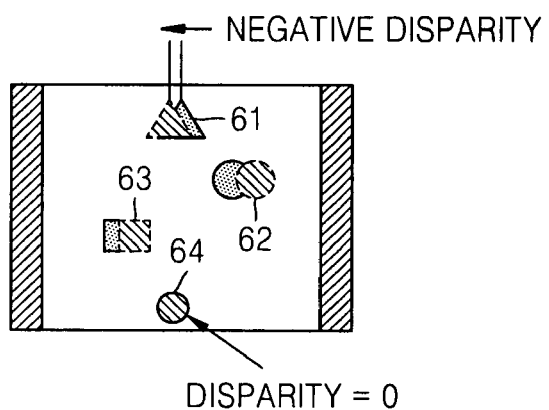

FIGS. 6A-6C illustrate a process of generating a stable stereo image by moving the left-eye image and the right-eye image of FIGS. 5A-5C to the right and left, respectively, according to an embodiment of the present invention. In other words, FIGS. 6A-6C illustrate a method of processing an image to provide a stable 3D image to users by adjusting disparities. FIG. 6A illustrates the left-eye image in FIG. 5A moved to the right, and FIG. 6B illustrates the right-eye image in FIG. 5B moved to the left. FIG. 6C illustrates the right-eye image in FIG. 6A synthesized with the left-eye image in FIG. 6B on a 3D stereo display according to an embodiment of the present invention.

Referring to FIG. 6C, the overall disparity of the synthesized image is smaller than that of the superimposed image illustrated FIG. 5C. Thus, images of some objects, for example, an image 61 of an object, have negative disparities. In other words, the image 61 has a negative depth and thus appears to be sunk into the screen. An image 64 is a convergence point having zero disparity and a depth equal to that of the screen. The disparities of images 62 and 63 are positive. Therefore, the images 62 and 63 appear to protrude from the screen.

When the right- and left-eye images are synthesized as illustrated in FIG. 6C, the images of the objects within the synthesized image have more various depths than those of the superimposed image illustrated in FIG. 5C. Therefore, a more stable and stereoscopic image can be provided to users. A method of determining a horizontal movement value by estimating disparities between input right- and left-eye images when the right -and left-eye images are horizontally moved at predetermined intervals and a disparity histogram indicating the relationship between the estimated disparities and a frequency of occurrence of the estimated disparities in an image according to an embodiment of the present invention will now be described.

Figure 7:
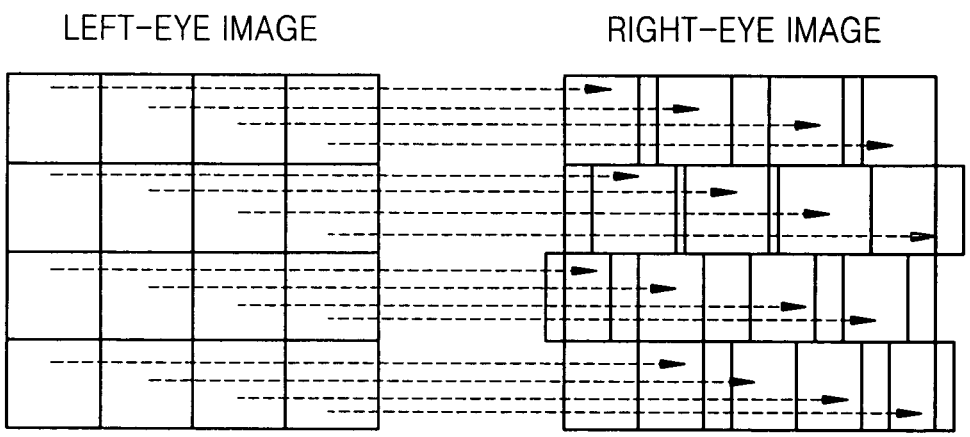
FIG. 7 illustrates block-based disparity estimation (DE) according to an exemplary embodiment of the present invention.

FIG. 7 illustrates block-based disparity estimation (DE) according to an embodiment of the present invention.

Referring to FIG. 7, a left-eye image is divided into N×N blocks of equal size. Blocks of a right-eye image which are most similar to corresponding blocks in the left-eye image are estimated using a sum of absolute difference (SAD) or a mean of absolute difference (MAD). In this case, a distance between a reference block and an estimated block is defined as a disparity vector (DV). Generally, a DV is assigned to each pixel in the reference image. However, to reduce the amount of computation required, it is assumed that the DVs of all pixels in a block are approximately the same in the block-based DE. The performing of DE on each pixel to obtain the DV for each pixel is called pixel-based DE.

The block-based DE or the pixel-based DE is used to estimate a disparity.

Figure 8:
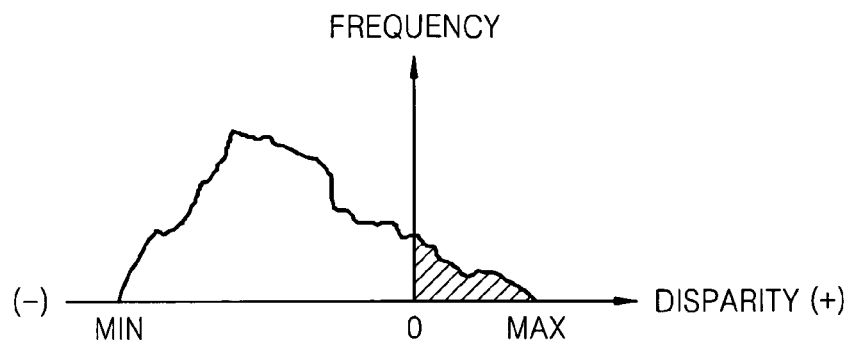
FIG. 8 illustrates a histogram of disparities between a left-eye image and a right-eye image according to an exemplary embodiment of the present invention.

FIG. 8 illustrates a histogram of disparities between a left-eye image and a right-eye image according to an embodiment of the present invention. Referring to FIG. 8, a horizontal axis of the histogram indicates the size of disparity, and a vertical axis of the histogram indicates frequency, i.e., the number of unit images having disparities of the same size. A unit image denotes a unit block in the block-based DE and a unit pixel in the pixel-based DE.

In the case of the histogram illustrated in FIG. 8, a stable stereo image can be provided to both eyes of users, and objects appear to protrude from the screen. In the histogram of FIG. 8, most images have negative disparities, and the rest have positive disparities.

Therefore, the histogram distribution of a general stereo image needs to be adjusted to the histogram distribution of FIG. 8.

Figure 9A:
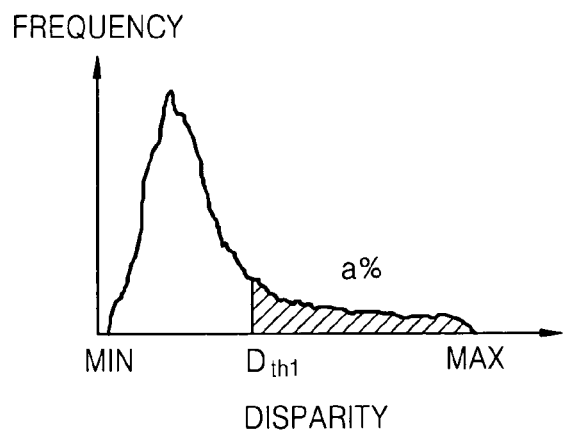
FIGS. 9A-9C illustrate three types of histograms of disparities between a left-eye image and a right-eye image in a multiview image acquired by a parallel multiview camera according to an exemplary embodiment of the present invention.
Figure 9B:
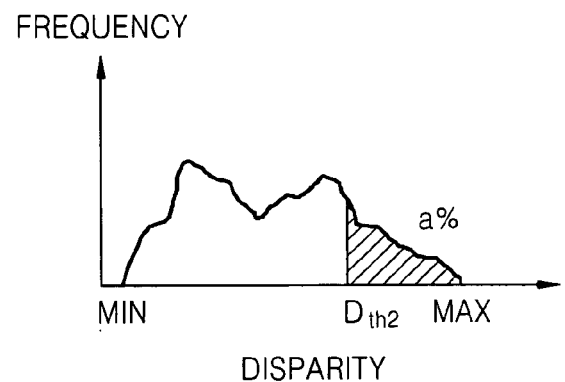
Figure 9C:
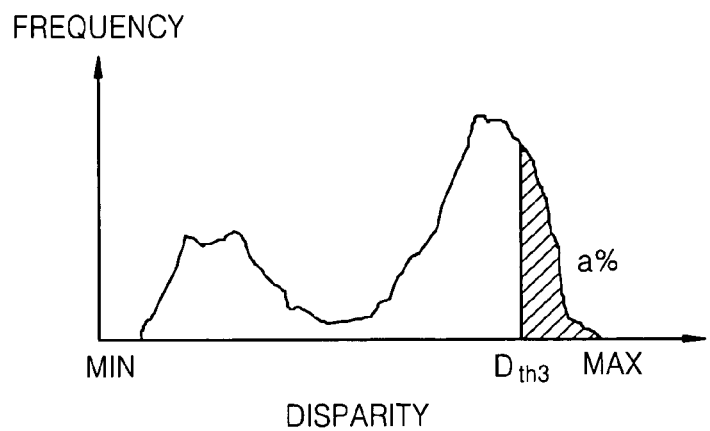

FIGS. 9A-9C illustrate three types of histograms of disparities between a left-eye image and a right-eye image in a multiview image acquired by a parallel multiview camera according to an embodiment of the present invention. Various types of histograms of disparities exist according to types of stereo cameras and a plurality of stereo image parameters, such as the distance between cameras and a focal length. The histograms of disparities between the left-eye image and the right-eye image filmed by the parallel multiview camera may be classified into three types of histograms as illustrated in FIGS. 9A-9C. The histogram of FIG. 9A exhibits a relatively high frequency at a region where disparity is low. The histogram of FIG. 9B exhibits a relatively high frequency at a region where disparity is intermediate. The histogram of FIG. 9C exhibits a relatively high frequency at a region where disparity is high.

However, all disparity values in a horizontal direction of a parallel multiview or stereo view are generally greater than zero as shown in FIGS. 9A through 9C since cameras are aligned parallel to one another and thus optical axes do not converge on any one point. Such left- and right-eye images having such histograms may cause severe eye fatigue. The stable histogram illustrated in FIG. 8 can reduce eye fatigue and be used to produce a 3D stereo image.

According to an embodiment of the present invention, the histograms of a 3D stereo image illustrated in FIGS. 9A through 9C are adjusted to the ideal disparity histogram illustrated in FIG. 8. To this end, the histograms illustrated in FIGS. 9A through 9C need to be moved in a negative direction.

As described above, to make an input image have the disparity histogram as illustrated in FIG. 8, the disparity histogram of the input image is analysed for each input frame, and a disparity threshold value Dth, which renders a predetermined ratio, a %, of all the disparities in the disparity histogram of the input image to be positive, is calculated. In this case, a is a constant value experimentally determined. It will be understood by those of ordinary skill in the art that the disparity threshold value Dth can be calculated using various methods.

The calculated threshold value is Dth1 in the histogram of FIG. 9A, Dth2 in the histogram of FIG. 9B, and Dth3 in the histogram of FIG. 9C. When the histograms of FIGS. 9A through 9C are moved in the negative direction by the calculated threshold values Dth1 through Dth3, respectively, a predetermined ratio, i.e., a %, of the entire disparity in each of the histograms of FIGS. 9A through 9C will be positive disparities as illustrated in FIG. 8.

In a disparity adjustment process, a left-eye image is moved to the right and a right-eye image is moved to the left based on a calculated threshold value. Then, the horizontally moved left-eye image and right-eye image are synthesized. This disparity adjustment process is for placing a converged point for objects on a stereoscopic screen at a position which provides optimal perception of depth.

Figures 10A, 10B:
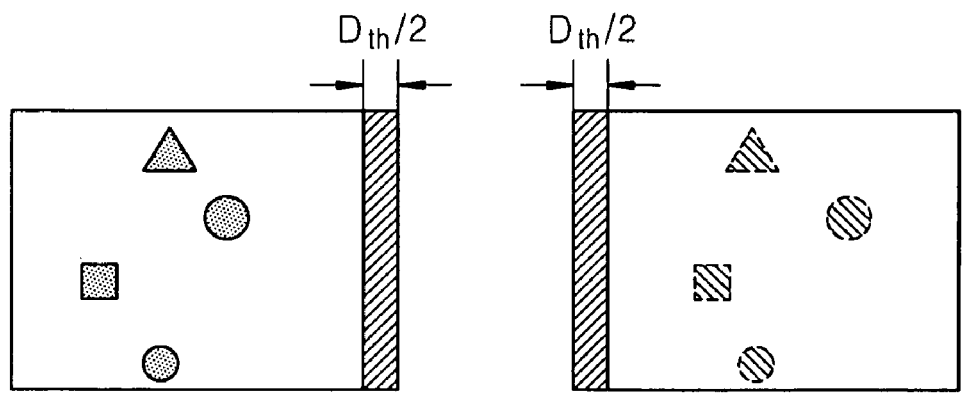
FIGS. 10A-10C illustrate horizontal movement of a left-eye image and a right-eye image based on a horizontal movement value which is determined using a disparity histogram according to an exemplary embodiment of the present invention.
Figure 10C:
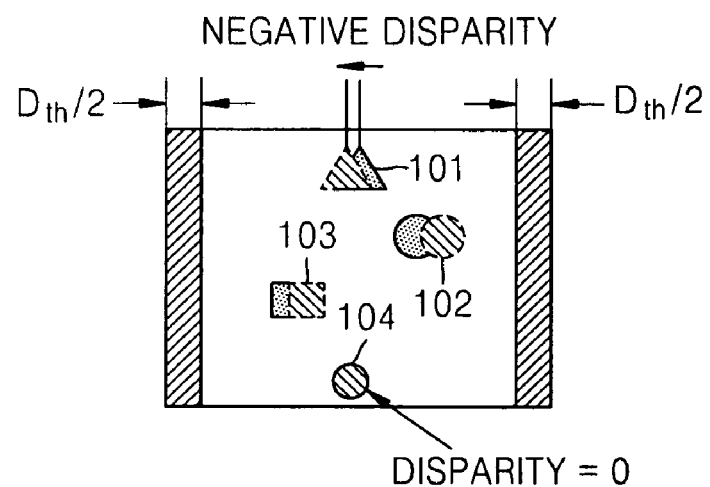

FIGS. 10A-10C illustrate horizontal movement of a left-eye image and a right-eye image based on a horizontal movement value which is determined using a disparity histogram according to an embodiment of the present invention.

As described above, according to the present embodiment, the disparity of a 3D image is adjusted by a disparity threshold value Dth such that positive disparities occupy a % of the entire disparity between left-and right-eye images. Referring to FIGS. 10A-10C, the left-eye mage is horizontally moved to the right by Dth/2, and the right-eye image is horizontally moved to the left by Dth/2. In so doing, the disparity of the 3D stereo image is adjusted.

FIG. 10C illustrates the left-eye image in FIG. 10A and the right-eye image in FIG. 10B horizontally moved and superimposed. Referring to FIG. 10C, an object 101, within the superimposed image has a negative disparity, objects 102 and 103 have positive disparities, and an object 104 has a zero disparity. Therefore, when the disparity of a 3D image is adjusted using disparities between the left- and right-eye images, objects within the superimposed image have various depths. Therefore, a more stable and stereoscopic image can be provided to users.

Figure 11:
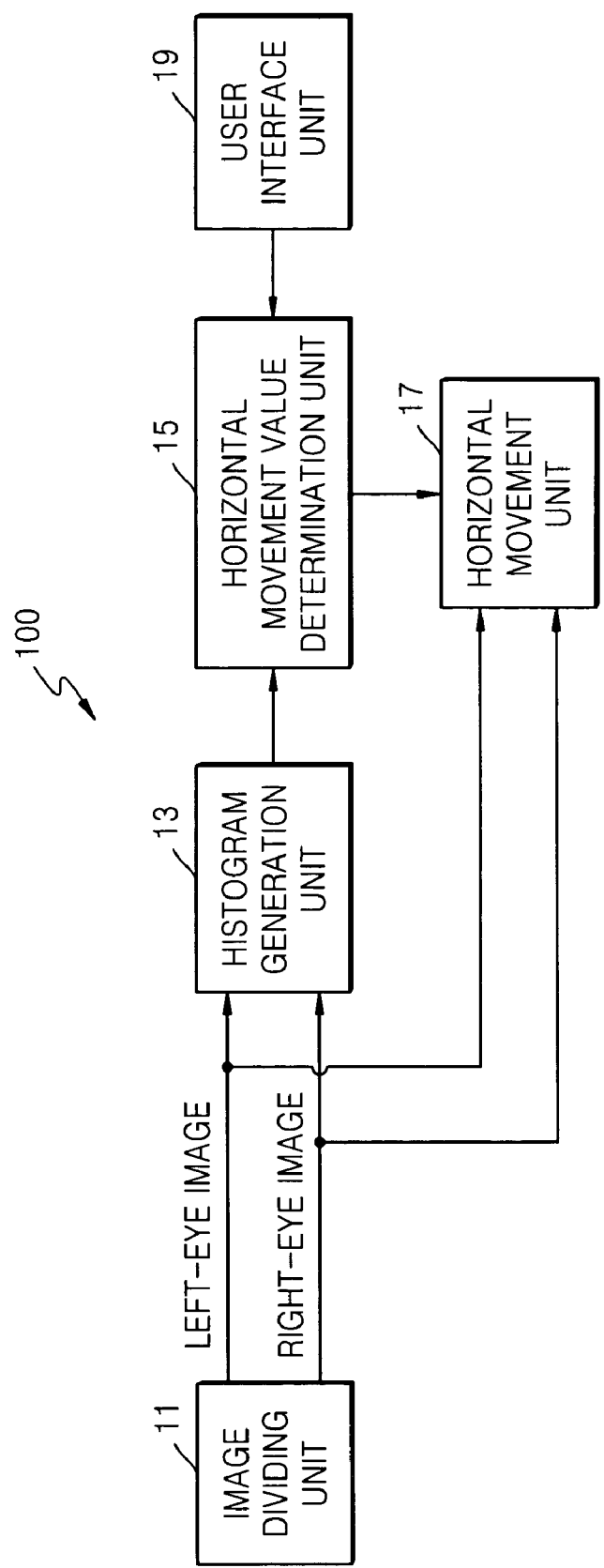
FIG. 11 is a block diagram of an image processing apparatus according to an embodiment of the present invention.

FIG. 11 is a block diagram of an image processing apparatus 100 according to an embodiment of the present invention. Referring to FIG. 11, the image processing apparatus 100 includes an image dividing unit 11, a histogram generating unit 13, a horizontal movement value determination unit 15, a horizontal movement unit 17, and a user interface unit 19.

The image dividing unit 11 receives a 3D image and divides the 3D image into a right-eye image and a left-eye image. Then, the image dividing unit 11 transmits the right-eye image and the left-eye image to the histogram generation unit 13 and the horizontal movement unit 17.

The histogram generation unit 13 estimates the disparities between the right-eye image and the left-eye image, measures the frequency with which the estimated disparities occur, and generates a histogram for the disparities and the frequency. In this case, the block-based DE or the pixel-based DE described above or other methods may be used.

The horizontal movement value determination unit 15 receives the generated histogram from the histogram generation unit 13 and determines a horizontal movement value for the left- and right-eye images. In detail, the horizontal movement value determination unit 15 analyzes the disparity histogram for each input frame, calculates a disparity threshold value Dth, which renders positive disparities to occupy a predetermined ratio, i.e., a %, of the entire disparity, and determines a value corresponding to half the calculated disparity threshold value Dth to be the horizontal movement value.

The horizontal movement value determination unit 15 may receive the predetermined ratio from a user through the user interface unit 19 and determine the disparity threshold value Dth. Alternatively, the horizontal movement value determination unit 15 may receive the disparity threshold value Dth directly from the user through the user interface unit 19. In this case, the user may experimentally input various ratios or threshold values, determine an appropriate horizontal movement value, and adjust the disparity of the 3D image based on the determined threshold value to provide optimal 3D effects.

The horizontal movement unit 17 moves the left-eye image to the right and the right-eye image to the left by the horizontal movement value received from the horizontal movement value determination unit 15 and outputs the disparity-adjusted left- and right-eye images. Although not shown, the disparity adjustment apparatus 100 may include a 3D stereo display unit to display the disparity-adjusted left- and right-eye images which are output from the horizontal movement unit 17.

It will be apparent that the left-eye image and the right-eye image need not be moved an equal amount. For example, the right-eye image may be moved while the left-eye image is not moved.

Figure 12:
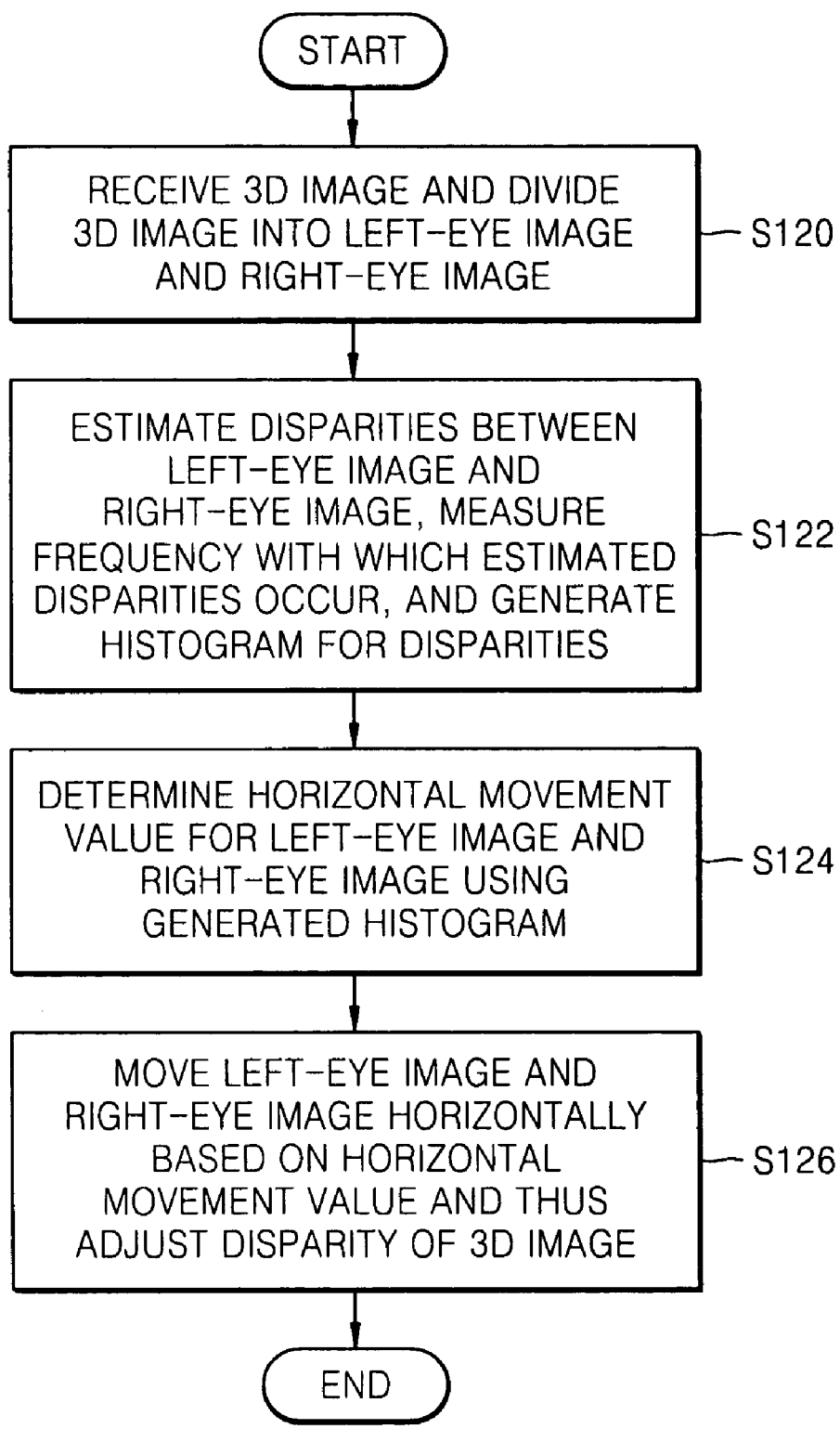
FIG. 12 is a flowchart illustrating an image processing method according to an embodiment of the present invention.

FIG. 12 is a flowchart illustrating an image processing method according to an embodiment of the present invention. Referring to FIG. 12, a 3D image is received and divided into a left-eye image and a right-eye image (S120). Disparities between the left-eye image and the right-eye image are estimated, the frequency with which the estimated disparities occur is measured, and a histogram for the disparities and the frequency is generated (S122). A horizontal movement value for the right-eye image and the left-eye image is determined based on the histogram (S124). In detail, a disparity threshold value, which renders a predetermined ratio of all the disparities in the disparity histogram to be positive is calculated and the horizontal movement value is determined using the calculated disparity threshold value. The horizontal movement value may be determined to be equal to half the threshold value. In addition, the predetermined ratio or the disparity threshold value may be input as a user input signal by a user.

The left-eye image and the right-eye image are horizontally moved based on the determined horizontal movement value and the disparities between the left-eye image and the right-eye image are adjusted (S126). The disparity-adjusted left- and right-eye images are output and displayed.

The image processing method and apparatus according to an aspect of the present invention can be used to control convergence of an image acquired by a multiview camera based on disparities between left-and right-eye images, and thus the image can be used for a 3D stereo display, thereby enhancing 3D effects and reducing eye fatigue.

The image processing method and apparatus according to an aspect of the present invention can be used to control convergence of an image by adjusting the disparity of the image at a receiving end which receives and displays a 3D image.

The present invention can also be implemented as computer-readable code on a computer-readable recording medium. Also, functional programs, code, and code segments for accomplishing the present invention can be easily construed by programmers skilled in the art to which the present invention pertains. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image processing apparatus comprising:
an image dividing unit which receives a three-dimensional (3D) image and divides the 3D image into a left-eye image and a right-eye image;
a histogram generation unit which breaks down the left-eye image and the right-eye image into blocks, estimates disparities between all of the blocks of the left-eye image and the right-eye image, measures a frequency with which the estimated disparities occur, and generates a histogram representing all of the estimated disparities and the measured frequency;
a horizontal movement value determination unit which determines a horizontal movement value for the left-eye image and the right-eye image using the generated histogram; and
a horizontal movement unit which horizontally moves at least one of the left-eye image and the right-eye image based on the determined horizontal movement value,
wherein the horizontal movement value determination unit calculates a threshold value which renders a predetermined ratio of the disparities in the histogram to be positive and determines the horizontal movement value using the calculated threshold value.

2. The apparatus of claim 1, wherein the horizontal movement value determination unit determines a value corresponding to half the threshold value to be the horizontal movement value.

3. The apparatus of claim 2, wherein the horizontal movement unit moves the left-eye image and the right-eye image horizontally based on the threshold value and thus adjusts the disparity.

4. The apparatus of claim 2, further comprising a user interface unit receiving the predetermined ratio or the threshold value from a user through a user input signal and transmitting the predetermined ratio or the threshold value to the horizontal movement value determination unit, wherein the horizontal movement value determination unit determines the horizontal movement value using the received predetermined ratio or threshold value.

5. The apparatus of claim 1, further comprising a 3D stereo display unit displaying the disparity-adjusted left-eye image and right-eye image output from the horizontal movement unit.

6. An image processing method comprising:
receiving a three-dimensional (3D) image and dividing the 3D image into a left-eye image and a right-eye image;
breaking down the left-eye image and the right-eye image into blocks;
estimating disparities between all of the blocks of the left-eye image and the right-eye image, measuring a frequency with which the estimated disparities occur, and generating a histogram representing all of the estimated disparities and the measured frequency;

determining a horizontal movement value for the left-eye image and the right-eye image using the generated histogram; and moving at least one of the left-eye image and the right-eye image horizontally based on the determined horizontal movement value to adjust disparities, wherein the determination of the horizontal movement value comprises:

calculating a threshold value which renders a predetermined ratio of the disparities in the histogram to be positive; and determining the horizontal movement value using the calculated threshold value.

7. The method of claim 6, wherein the determination of the horizontal movement value comprises determining a value corresponding to half the threshold value to be the horizontal movement value.

8. The method of claim 7, wherein the horizontal movement of the left-eye image and the right-eye image comprises moving the left-eye image and the right-eye image horizontally based on the threshold value and thus adjusting the disparity.

9. The method of claim 6, further comprising:

receiving the predetermined ratio or the threshold value from a user through a user input signal; and determining the horizontal movement value using the received predetermined ratio or the threshold value.

10. The method of claim 6, further comprising displaying the disparity-adjusted left-eye image and right-eye image.

11. A non-transitory, tangible computer-readable recording medium on which a program for executing the method of claim 6 is recorded.

12. An image processing apparatus comprising:

an image dividing unit which receives an image and divides the image into a first image and a second image;

a histogram generation unit which breaks down the first image and the second image into blocks, estimates disparities between all of the blocks of the first image and the second image, measures a frequency with which the estimated disparities occur, and generates a histogram representing all of the estimated disparities and the measured frequency;

a movement value determination unit which determines a movement value for the first image and the second image using the generated histogram; and a movement unit which moves at least one of the first image and the second image based on the determined movement value and thus adjusting the disparity of the image, wherein the movement value determination unit calculates a threshold value which renders a predetermined ratio of the disparities in the histogram to be positive and determines the movement value using the calculated threshold value.

13. An image processing method comprising:

receiving an image and dividing the image into a first image and a second image;

breaking down the first image and the second image into blocks;

estimating disparities between all of the blocks of the first image and the second image, measuring a frequency with which the estimated disparities occur, and generating a histogram representing all of the estimated disparities and the measured frequency;

determining a movement value for the first image and the second image using the generated histogram; and moving at least one of the first image and the second image based on the determined movement value and thus adjusting the disparity of the image, wherein the determination of the movement value comprises:

calculating a threshold value which renders a predetermined ratio of the disparities in the histogram to be positive; and determining the movement value using the calculated threshold value.

14. The apparatus of claim 1, wherein the horizontal movement value determination unit determines a horizontal movement value that results in a histogram of disparities between the left-eye image and the right-eye image after the horizontal movement that has both positive and negative disparities.

15. The method of claim 6 wherein the horizontal movement value is determined to result in a histogram of disparities between the left-eye image and the right-eye image after the horizontal movement that has both positive and negative disparities.

16. The apparatus of claim 12, wherein the movement value determination unit determines a movement value that results in a histogram of disparities between the left-eye image and the right-eye image after the movement that has both positive and negative disparities.

17. The method of claim 13, wherein the movement value is determined to result in a histogram of disparities between the left-eye image and the right-eye image after the movement that has both positive and negative disparities.

* * * * *